(12) United States Patent
Zhai

(10) Patent No.: US 10,783,382 B2
(45) Date of Patent: Sep. 22, 2020

(54) SYSTEMS AND METHODS FOR BUFFER-FREE LANE DETECTION

(71) Applicant: SEMICONDUCTOR COMPONENTS INDUSTRIES, LLC, Phoenix, AZ (US)

(72) Inventor: Yan Zhai, Santa Clara, CA (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 393 days.

(21) Appl. No.: 15/092,432

(22) Filed: Apr. 6, 2016

(65) Prior Publication Data

US 2017/0293811 A1 Oct. 12, 2017

(51) Int. Cl.
*G06K 9/00* (2006.01)
*B60R 1/00* (2006.01)
(Continued)

(52) U.S. Cl.
CPC ............ *G06K 9/00798* (2013.01); *B60R 1/00* (2013.01); *B60W 30/12* (2013.01); *G06K 9/3233* (2013.01);
(Continued)

(58) Field of Classification Search
CPC .... G06K 9/00798; G06K 9/46; G06K 9/3233; H04N 7/181; B60R 1/00;
(Continued)

(56) References Cited

U.S. PATENT DOCUMENTS

| 6,819,779 | B1* | 11/2004 | Nichani ............. G06K 9/00798 |
| | | | 382/104 |
| 7,379,815 | B2 | 5/2008 | Kobayashi et al. |

(Continued)

FOREIGN PATENT DOCUMENTS

| CN | 104866817 | | 8/2015 | |
| WO | WO2016130719 | * | 8/2016 | ............. G01C 21/32 |

OTHER PUBLICATIONS

Aly, "Real time Detection of Lane Markers in Urban Streets." In 2008 IEEE Intelligent Vehicles Symposium. Jun. 2008.
(Continued)

*Primary Examiner* — Dakshesh D Parikh
(74) *Attorney, Agent, or Firm* — Treyz Law Group, P.C.; Matthew R. Williams

(57) ABSTRACT

A method of performing lane detection without the use of a frame buffer may include capturing image frames with an image sensor in a vehicular imaging system. Feature extraction circuitry in the vehicular imaging system may analyze a frame to detect features corresponding to possible lane markers. The features may be extracted and stored in memory for further processing, while the rest of the frame may not be stored in memory and may not undergo further processing. Processing circuitry may perform a first estimation of lane marker location based on a continuous feature that is present in multiple different image frames and may perform a second estimation of lane marker location based on multiple features in a single image frame that form a connected feature. The processing circuitry may determine the presence of a lane marker based on the continuous feature and the connected feature.

19 Claims, 8 Drawing Sheets

(51) Int. Cl.
*B60W 30/12* (2020.01)
*G06K 9/32* (2006.01)
*G06K 9/46* (2006.01)
*H04N 7/18* (2006.01)

(52) U.S. Cl.
CPC ............... *G06K 9/46* (2013.01); *H04N 7/181* (2013.01); *B60R 2300/307* (2013.01); *B60W 2420/40* (2013.01); *B60W 2554/00* (2020.02); *B60W 2710/18* (2013.01); *B60W 2710/20* (2013.01)

(58) Field of Classification Search
CPC ............ B60R 2300/307; B60W 30/12; B60W 2420/40; B60W 2550/10; B60W 2710/20; B60W 2710/18
USPC ........................................................ 348/148
See application file for complete search history.

(56) References Cited

U.S. PATENT DOCUMENTS

| | | | | |
|---|---|---|---|---|
| 9,104,702 | B2* | 8/2015 | Takahashi | G01C 21/20 |
| 2010/0208937 | A1* | 8/2010 | Kmiecik | G01C 21/32 |
| | | | | 382/100 |
| 2012/0099766 | A1* | 4/2012 | Klein | G06K 9/00798 |
| | | | | 382/104 |
| 2014/0149376 | A1* | 5/2014 | Kutaragi | G06K 9/4676 |
| | | | | 707/706 |
| 2014/0240464 | A1* | 8/2014 | Lee | G01B 11/2545 |
| | | | | 348/47 |
| 2015/0210274 | A1* | 7/2015 | Clarke | G06K 9/00798 |
| | | | | 382/104 |
| 2017/0010616 | A1* | 1/2017 | Shashua | G05D 1/0221 |
| 2017/0011269 | A1* | 1/2017 | Yamaguchi | G06K 9/00798 |

OTHER PUBLICATIONS

Ding et al., "An Urban Lane Detection Method Based on Inverse Perspective Mapping." In Advanced Science and Technology Letters, vol. 63, pp. 53-58. 2014.

Kumar et al., "Review of Lane Detection and Tracking Algorithms in Advanced Driver Assistance System." In International Journal of Computer Science and Information Technology, vol. 7, No. 4, pp. 65-78. Aug. 2015.

* cited by examiner

SYSTEMS AND METHODS FOR BUFFER-FREE LANE DETECTION

BACKGROUND

This relates generally to imaging systems, and more particularly, to imaging systems with lane detection capabilities.

Image sensors are commonly used in electronic devices such as cellular telephones, cameras, and computers to capture images. In a typical arrangement, an electronic device is provided with an array of image pixels arranged in pixel rows and pixel columns. The image pixels contain a photodiode for generating charge in response to image light. Circuitry is commonly coupled to each pixel column for reading out image signals from the image pixels.

Image sensors are commonly used in vehicular applications (e.g., automotive, aircraft, marine, and other applications). In automotive applications, imaging systems may be used to detect lane markers on a road. For example, an image sensor in an automotive imaging system may capture image frames of a road on which a car is travelling. Each of these images may be stored in one or more full-frame buffers in the automotive imaging system and processed to determine the presence of lane markers on the road. However, such full-frame buffers may require large amounts of memory, and processing full images to determine the presence of lane markers can place large processing and power burdens on image processing circuitry that may also have to perform one or more other image processing tasks simultaneously.

It would therefore be desirable to provide systems and methods with improved lane detection capabilities.

DETAILED DESCRIPTION

Figure 1:
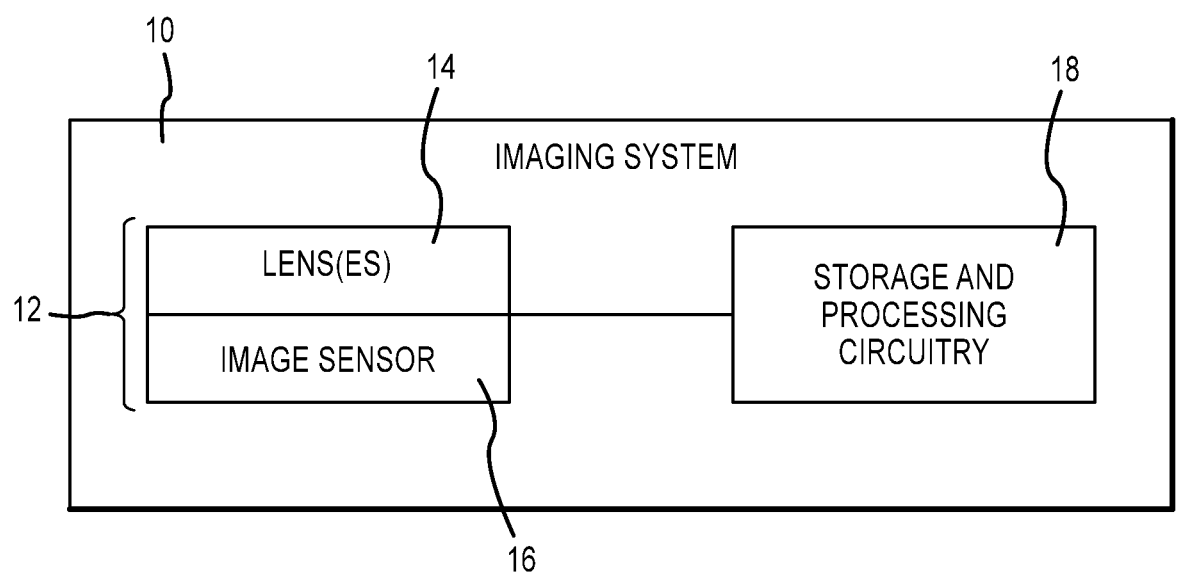
FIG. 1 is a diagram of an illustrative electronic device having an image sensor and processing circuitry for capturing images using a pixel array in accordance with an embodiment of the present invention.

Imaging systems having digital camera modules are widely used in electronic devices such as digital cameras, computers, cellular telephones, and other electronic devices. A digital camera module may include one or more image sensors that gather incoming light to capture an image.

In some situations, imaging systems may form a portion of a larger system such as a surveillance system, a safety system for a vehicle (e.g., an automobile, a bus, a truck, a motorcycle, or any other vehicle), and/or a driver assist system (sometimes referred to herein as an advanced driver assistance system or ADAS). In a driver assistance system, images captured by the imaging system may be used to determine environmental conditions surrounding the vehicle. As examples, vehicle safety systems may include systems such as a parking assistance system, an automatic or semi-automatic cruise control system, an auto-braking system, a collision avoidance system, a lane detection or lane marker detection system, a lane keeping system (sometimes referred to as a lane drift avoidance system), pedestrian detection and/or avoidance systems, a driver behavior analysis system, etc. In these scenarios, image data captured by the imaging system may be used by the driver assistance system for performing automotive functions (e.g., functions associated with the mechanical operation of the automobile that may or may not be associated with ensuring the safety of the automobile and/or the safety of objects and in the vicinity of the automobile). In at least some instances, an imaging system may form part of a vehicle safety system and/or driver assist system for a semi-autonomous or autonomous self-driving vehicle.

The vehicle safety system may include computing equipment (e.g., implemented on storage and processing circuitry having volatile and/or non-volatile memory and a processor such as a central processing system or other processing equipment) and corresponding drive control equipment (sometimes referred to herein as drive control circuitry) that translates instructions generated by the computing equipment into mechanical operations associated with driving the vehicle. For example, the drive control equipment may actuate mechanical systems associated with the vehicle in response to control signals generated by the driver assist system. The vehicle safety system may process the image data to generate the control signals such that the control signals are used to instruct the drive control equipment to perform desired mechanical operations associated with driving the vehicle. For example, the drive control system may adjust the steering wheels of the vehicle so that the vehicle turns in a desired direction (e.g., for performing a parking assist function in which the vehicle is guided by the vehicle safety system into a parking spot, for performing lane assist functions in which the steering wheel is automatically adjusted to maintain the vehicle's course between road lane markers), may control the engine (motor) of the vehicle so that the vehicle has a certain speed or so that the vehicle moves forwards or in reverse with a desired engine power (e.g., the drive control system may adjust a throttle of the vehicle so that the vehicle maintains a desired distance with respect to another vehicle in front of the vehicle, etc.), may adjust braking systems associated with the vehicle (e.g., may actuate a parking brake, anti-lock brakes, etc.), or may perform any other mechanical operation associated with movement of the vehicle. The vehicle safety system may perform hazard detection operations that detect objects to the side of, in front of, and/or behind the vehicle that warn the driver of the hazard (e.g., via an alarm or display) and/or that automatically adjust the movement of the vehicle (e.g., by controlling the drive system) to avoid the detected hazard or object. Functions performed by the vehicle safety system for maintaining the safety of the vehicle (e.g., by controlling the drive control system) may sometimes be referred to herein as vehicle safety operations, vehicle safety functions, and/or driver assist functions.

Driver assistance systems may include one or more processors that are dedicated mainly or entirely to performing processing operations in connection with the driver assist system. For example, an advanced driver assistance system may include one or more dedicated advanced driver assistance system processors (ADAS processors) for processing images captured by image sensors in a vehicle safety system and/or controlling drive control equipment that receives control signals from the vehicle safety system.

A dedicated ADAS processor may need to perform numerous different image processing operations on multiple different images (or image streams) from multiple different cameras that form the driver assist system for a vehicle. For example, an ADAS processor may need to run a variety of different computer vision algorithms such as object detection, pedestrian detection, collision avoidance, image stitching, and lane detection and keeping operations. Some or all of these operations may require full-frame buffering and image processing, which can require large amounts of processing power and place a computational burden on the dedicated ADAS processor. In general, simultaneously running multiple full-frame machine vision algorithms can be challenging.

By redistributing low-to-mid-level computer vision tasks (e.g., image processing operations that can be achieved with relatively low processing power) to other processing components (e.g., on-sensor processing circuitry or discrete processing circuitry dedicated to a given image sensor or particular machine vision operation or algorithm), some of the processing burden that would otherwise be placed on a dedicated ADAS processor can be relieved. For example, a modified lane detection algorithm that does not require a full-frame buffer and corresponding lane detection circuitry may be used to reduce the overall processing burden on a dedicated ADAS processor.

Image sensors such as those implemented in an imaging system of a vehicle safety system may include one or more arrays of image pixels. The pixels in the array may include photosensitive elements such as photodiodes that convert the incoming light into electric charge. Pixel arrays may have any number of pixels (e.g., hundreds or thousands or more). A typical image sensor may, for example, have hundreds, thousands, or millions of pixels (e.g., megapixels). If desired, each pixel may have an associated microlens (and color filter element) formed over that pixel. Image sensors may include control circuitry such as circuitry for operating the image pixels and readout circuitry for reading out image signals corresponding to the electric charge generated by the photosensitive elements.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera 12 may include one or more lenses 14 and one or more corresponding image sensors 16.

Lenses 14 may include fixed and/or adjustable lenses and may include microlenses formed on an imaging surface of image sensor 16. During image capture operations, light from a scene may be focused onto image sensor 16 by lens(es) 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

If desired, an imaging system 10 of the type shown in FIG. 1 may be a dedicated lane detection system that captures images using image sensor 16 and performs lane detection operations using a lane detection algorithm (e.g., a buffer-free lane detection algorithm) using storage and processing circuitry 18. Such an imaging system 10 may transmit lane detection signals to a main ADAS processor (e.g., for further processing or for routing to drive control circuitry), if desired. This, however, is merely illustrative. In general, an imaging system 10 may capture and process images in connection with any suitable vehicle safety or driver assist operations.

Figure 2:
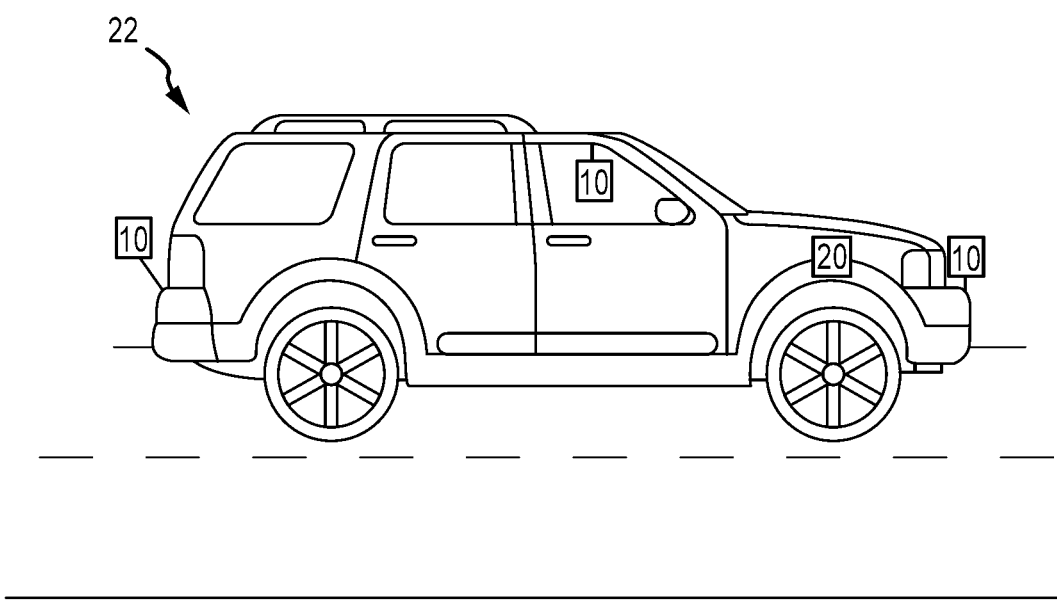
FIG. 2 is a diagram of an illustrative vehicle having an imaging system and vehicular imaging system processing circuitry in accordance with an embodiment of the present invention.

An illustrative example of a vehicle 22 such as an automobile is shown in FIG. 2. As shown in the illustrative example of FIG. 2, automobile 22 may include one or more imaging systems 10. Imaging systems 10 may be imaging systems with dedicated image capture and/or image processing functions (e.g., a lane detection imaging system). If desired, an imaging system 10 may perform some or all of the image processing functions associated with a given driver assist operation. A dedicated driver assist processor such as processor 20 may receive signals from imaging systems 10 that require little or no further processing by driver assist processor 20 and may be used by processor 20 to perform drive control operations. In this way, dedicated imaging system 10 may reduce the computational burden on an ADAS processor 20.

In another suitable example, an imaging system 10 may perform only some or none of the image processing operations associated with a given driver assist function. For example, an imaging system 10 may merely capture images of the environment surrounding the vehicle 22 and transmit the image data to ADAS processor 20 for further processing. Such an arrangement may be used for vehicle safety system functions that require large amounts of processing power and memory (e.g., full-frame buffering and processing of captured images). If desired, the processing of images captured by an imaging system 10 may be divided between processing circuitry 18 and ADAS processor 20. The foregoing examples are, however, merely illustrative. In general, the processing of captured images may be divided between imaging system 10 and dedicated driver assist processor 20 in any desired configuration for any desired driver assist operation.

In the illustrative example of FIG. 2, a first imaging system 10 is shown mounted on the front of car 22, and a second imaging system 10 is shown mounted in the interior of car 22. If desired, an imaging system 10 may be mounted at the rear end of vehicle 22 (i.e., the end of the vehicle opposite the location at which first imaging system 10 is mounted in FIG. 2). This, however, is merely illustrative. One or more imaging systems 10 may be mounted on or within a vehicle 22 at any suitable location(s).

Figure 3A:
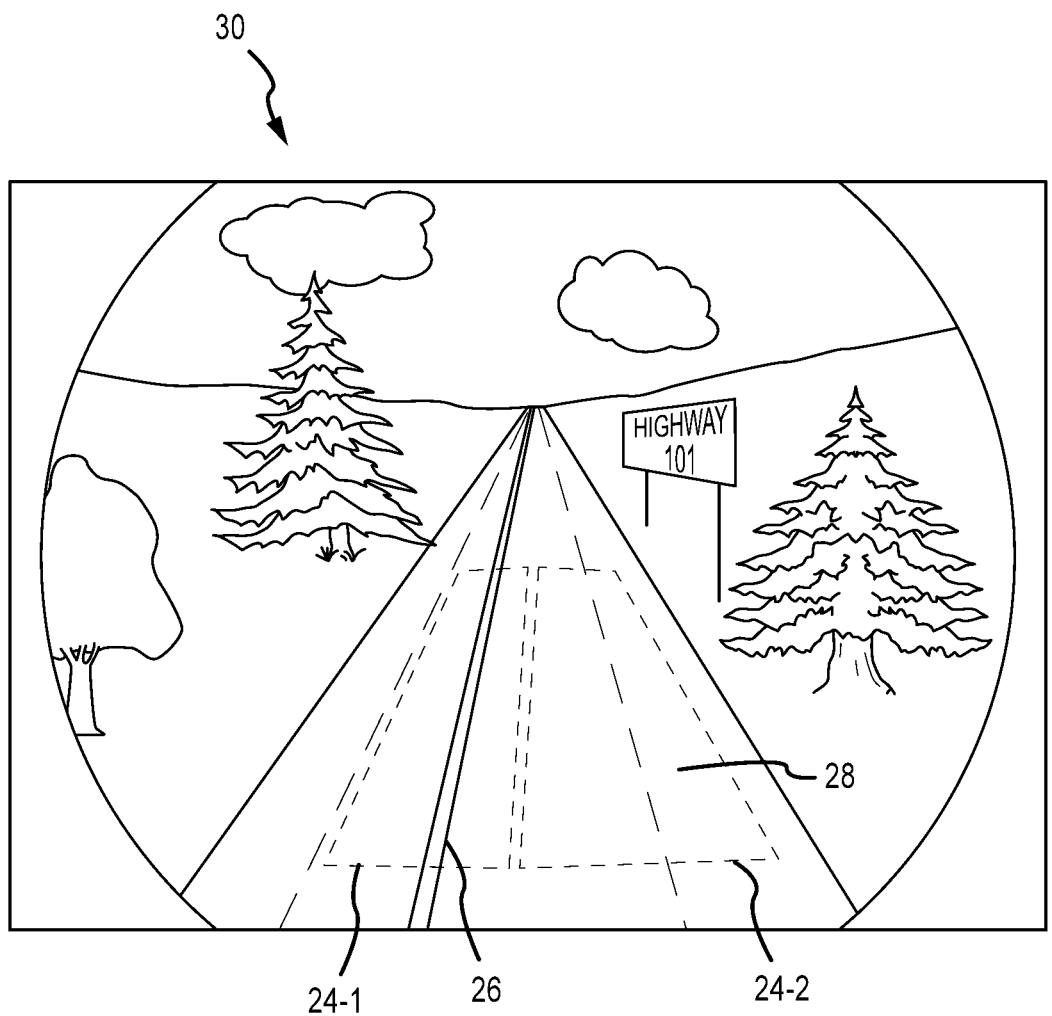
FIG. 3A is an image-plane view of an illustrative image frame captured by an imaging system such as that shown in FIGS. 1 and 2 in accordance with an embodiment of the present invention.

An image-plane view of an illustrative image frame 30 captured by an imaging system 10 is shown in FIG. 3A. As shown in FIG. 3A, an image frame 30 viewed in the image plane may represent a scene as viewed from the perspective of a pixel array in image sensor 16 that captured the image. Because image frames in the image plane are viewed from this perspective, perspective distortion may be present in the image. For example, lane markers 26 and 28 appear to converge in FIG. 3A, although in reality, lane markers 26 and 28 run parallel to one another for the length of the road on which car 22 is travelling.

An image frame 30 may include region of interest 24. In the illustrative example of FIG. 3A, first and second (i.e., left and right) respective regions of interest 24-1 and 24-2 are shown by the dotted lines overlaid onto image frame 30. Region of interest 24-1 may represent a region in front of vehicle 22 in which lane markers 26 on the left-hand side of vehicle 22 are expected to be present as vehicle 22 travels along a road. Region of interest 24-2 may represent a region in front of vehicle 22 in which lane markers 28 on the right-hand side of vehicle 22 are expected to be present as vehicle 22 travels along a road. While image sensor 16 may capture an entire image frame as shown in FIG. 3A, lane detection processing of the image frame may only occur for portions of the image located within the first and second regions of interest 24-1 and 24-2. Performing lane detection processing operations on only a portion of the captured image may require less processing power than performing full-frame lane detection processing operations and may reduce algorithm complexity.

Figure 3B:
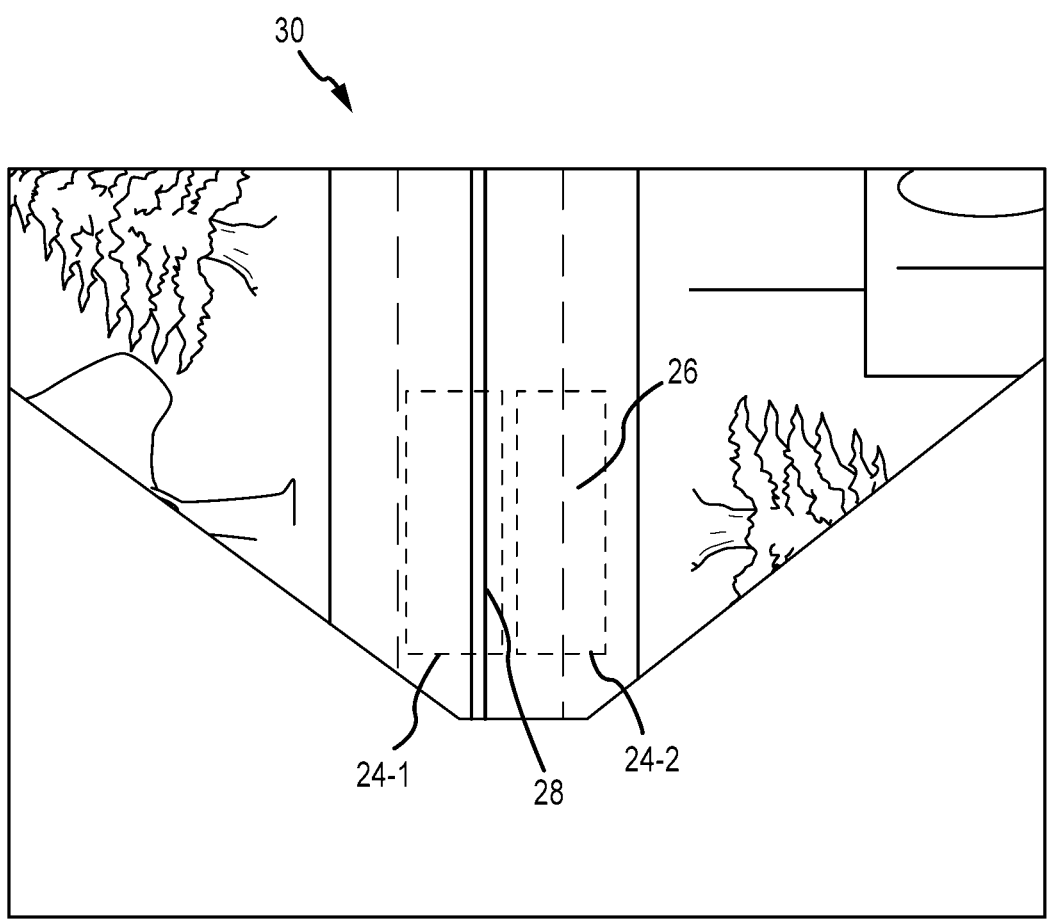
FIG. 3B is a ground-plane view of an illustrative image frame such as that shown in FIG. 3 in accordance with an embodiment of the present invention.

A ground-plane view of an illustrative image frame 30 captured by an imaging system 10 is shown in FIG. 3B. As shown in FIG. 3B, an image frame 30 viewed in the ground plane may form a bird's-eye perspective of the scene. For example, an image frame captured by an image sensor 16 (i.e., an image frame in the image plane) may be processed and projected onto the ground plane to generate a ground-plane image as shown in FIG. 3B. If desired, only features extracted from an image in the image plane may be mapped to the ground plane. By extracting feature points in the image plane and projecting only the extracted feature points into the ground plane, the processing and computational power required with performing the mapping may be reduced (compared to mapping the entire image from the image plane to the ground plane, for example). Because feature points in the ground plane are viewed from the top-down, the perspective distortion present in the image plane view of the image may be completely or substantially eliminated. For example, FIG. 3B shows that lane markers 26 and 28 extend substantially parallel to one another.

In one suitable example, regions of interest 24-1 and 24-2 may be determined based on the ground plane view of an image frame 30. Because objects in the ground plane can be measured in absolute units (e.g., meters, millimeters, feet, inches, etc.), the regions of interest can be defined as a predetermined size and shape in the ground plane in front of (or behind, or on either side of) automobile 22. For example, regions of interest 24-1 and 24-2 may be defined as regions about 10 meters long and 6 meters wide in front of car 22, as measured in the ground plane. After defining regions of interest 24-1 and 24-2 in the ground plane, the regions of interest may be projected back into the image plane such that the regions of interest can define areas of captured image frame 30 as they appear in the image plane. Regions of interest determined in the ground plane may be projected back into the image plane based on known camera calibration values and settings that allow processing circuitry to determine locations in the image plane that correspond to given locations in the ground plane.

Performing lane detection operations using full image frames may be computationally intensive and place an increased burden on processing circuitry (e.g., an ADAS processor 20) in a vehicle 22, as well as requiring more on-sensor memory, which increases chip cost. In particular, full-frame lane detection algorithms require buffers for storing the image frames as they are captured by the image sensor while previously captured image frames are processed. When the buffering and processing requirements of these full-frame lane detection algorithms are combined with buffering and processing requirements of other driver assist system algorithms (e.g., pedestrian detection, collision avoidance, etc.), the processing and buffering burden on a vehicle system can be quite high.

Figure 4:
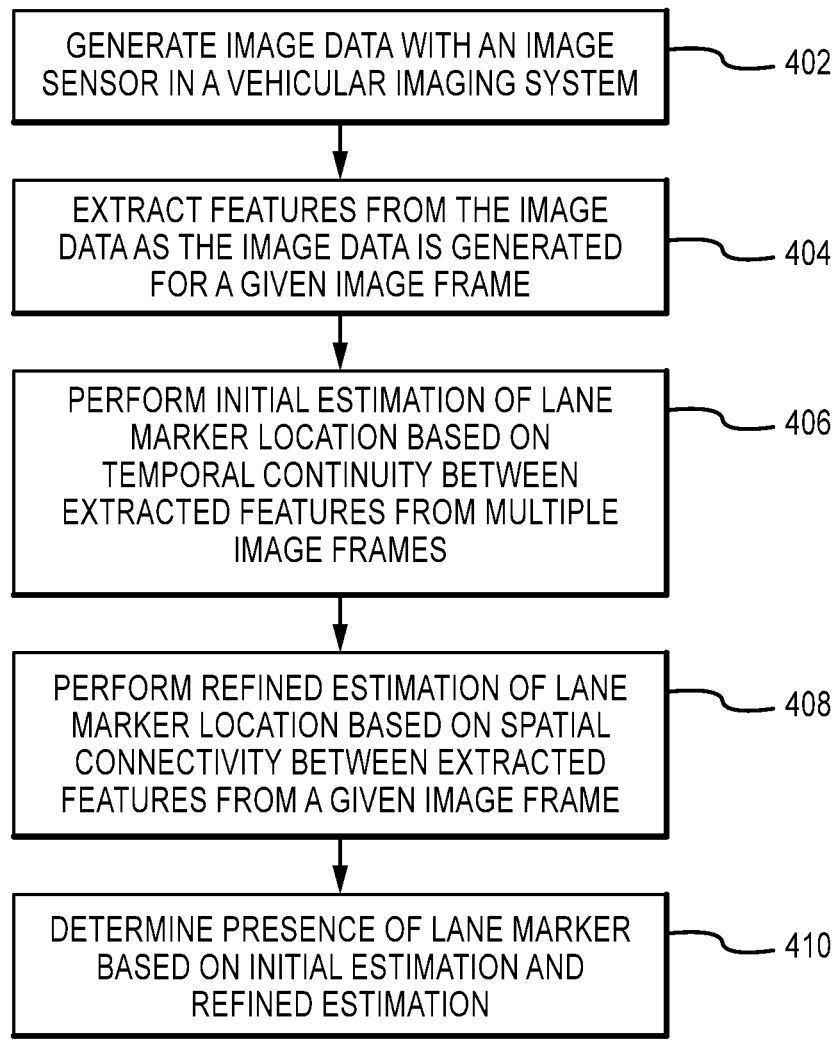
FIG. 4 is a flow chart of illustrative steps that may be performed in determining the presence of lane markers based on captured image frames in accordance with an embodiment of the present invention.

In order to reduce the computational burden of performing lane detection, buffer-free lane detection algorithms may be used. The "buffer-free lane detection algorithm" may not rely on full frame data (or full images) for lane detection. The detection is achieved by using streaming data (i.e., frame data is streamed row-by-row) as the image is captured and image data generated by the image sensor. A flow chart of illustrative steps that may be performed in accordance with a buffer-less lane detection algorithm is shown in FIG. 4.

At step 402, an image sensor such as image sensor 16 that is part of a vehicular imaging system in a vehicle 22 may be used to capture one or more images of the environment that surrounds vehicle 22. As described below, feature extraction may happen during (i.e., simultaneously with, at the same time as) image capture. Features may be extracted from individual rows of image data as the rows of image data are captured. When the capture of the image is complete, the extraction of feature points may also be complete. The captured image may be sent downstream for further processing by other systems in vehicle 20, but is not stored locally on the image sensor chip. Only the extracted features are stored locally for further processing. If desired, image sensor 16 may capture image frames at regular intervals, such as 1 frame per second (fps), 2 fps, 5 fps, 10 fps, 20 fps, 40 fps, 60 fps, or any other suitable frame rate. Each frame captured at step 402 may be an image frame in the image plane (as shown and described in connection with FIG. 3A, for example). This, however, is merely illustrative. If desired, regions of interest 24 may be determined for one image frame and applied to one or more subsequent image frames without mapping the subsequent image frames to the ground plane and/or determining discrete regions of interest for each frame.

At step 404, features (sometimes referred to herein as feature points, points of interest, or lane marker indicators) in image frames captured by image sensor 16 in step 402 may be extracted. Feature extraction may include processing a row of pixels (not the entire image). Image data is captured row-by-row as described in connection with step 402, and streamed to the processing circuitry 18. For example, each image frame 30 captured by image sensor 16 may include image data having pixel values corresponding to the pixels arranged in rows and columns in a pixel array in image sensor 12. Feature extraction circuitry in imaging system 10 (e.g., processing circuitry 18) may process one incoming row of pixel data at a time (serially processing data from each row in the frame, for example) during feature extraction operations. In one suitable example, only pixel values for portions of image 30 that are in regions of interest 24-1 and 24-2 may be processed during feature extraction operations (as these portions of the image have been pre-selected as the areas most likely to include lane markers). Processing of image frame 30 may include performing row-by-row analysis (i.e., analysis of the pixel values that correspond to pixels formed in given rows of the pixel array) of the portions of frame 30 in regions of interest 24-1 and 24-2, whenever pixel values for a given row are available (i.e., after pixel data for a given row has been generated). In this way, feature extraction can begin before the entire image has been captured. This processing may search for pixel values that are characteristic of a lane marker. For example, feature extraction may determine that a feature is present in the frame based on the position of the feature in the image plane, the width of the feature in pixels, and the color of the feature (as determined based on the pixel values, for example).

Once the features in an image frame have been identified, the processing circuitry may not process all other image data associated with the frame other than the features (e.g., the non-extracted portions of the image may be disregarded). The pixel values associated with the features may then be converted to image metadata (e.g., the row, column, and/or color associated with the pixel value, etc.). These metadata that represent the extracted feature may then be stored in a vector. In this way, only information that is relevant to the features (i.e., image data that indicates the presence of a lane marker) is stored and processed, eliminating the need for a buffer and enabling a buffer-free lane detection algorithm.

At step 406, an initial (first) estimation of lane marker location (i.e., lane marker presence) may be made. During this initial estimation, feature points from multiple image frames may be analyzed to determine the presence of similar feature points in each of the image frames. For example, processing circuitry 18 may compare features from two, three, four, five, ten, more than ten, or any other suitable number of frames to detect continuity between features in frames captured at different times. Temporal continuity between features may include detecting that features present in compared frames actually form one continuous feature (that was captured over the course of several frames, for example). When temporal continuity between features of different frames is detected, the features may be combined (sometimes referred to herein as temporal fusion) into a temporally continuous feature. This temporal fusion of features from different image frames may improve lane marker detectability by providing a short "history" of lane markers that were captured by the image sensor, while still requiring relatively little memory.

At step 408, a refined (second) estimation of lane marker location (i.e., lane marker presence) may be made. During this refined estimation, multiple feature points from a single given image frame may be checked for spatial connectivity (i.e., a connectivity check of feature points in the image plane may be performed). During the connectivity check, the multiple feature points from a given image may be checked to determine whether or not the feature points are connected to form an object that is similar to a line segment (e.g., a line segment that may correspond to a lane marker). In one suitable arrangement, the connectivity check may determine that multiple features in a given frame correspond to adjacent portions of an image frame. In another suitable example, the connectivity check may determine that the features correspond to pixel values generated by pixels that are directly to adjacent to each other in a given row or column of the pixel array. The spatial connectivity check may also correct perspective distortion that is present in the image plane. When multiple feature points in a given image are spatially connected, the features may be combined into a connected feature. A connected feature may be indicative of a lane marker in a given frame. In general, temporal fusion offers relatively robust lane marker detection, but is less accurate than the spatial connectivity check. The spatial connectivity check offers relatively accurate lane marker detection, but is less robust than temporal fusion.

At step 410, the presence of a lane marker may be determined based on the initial and refined estimations. For example, the processing circuitry 18 may use the initial and refined estimations to determine which feature points correspond to lane markers and which do not. Information on the detected lane markers may be sent directly to drive control circuitry, or may be send to a ADAS processor 20 for further processing or routing to other appropriate circuitry in vehicle 22.

Figure 5A:
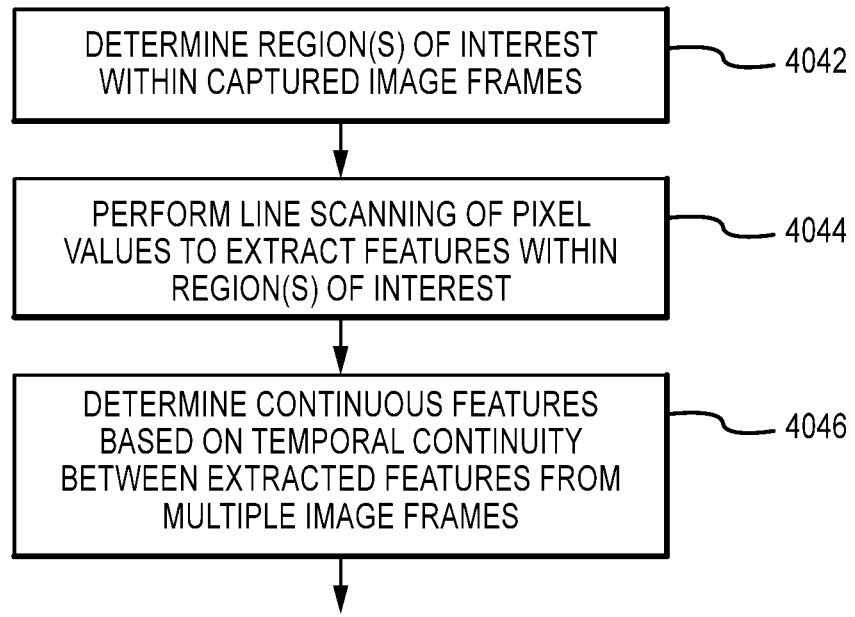
FIG. 5A is a flow chart of illustrative steps that may be performed in extracting features from captured image frames in accordance with an embodiment of the present invention.

A flow chart of illustrative steps that may be performed in accordance with extracting features from captured image frames (during step 404 of FIG. 4, for example) is shown in FIG. 5A.

At step 4042, regions of interest in a captured image frame may be determined. As described above in connection with FIGS. 3A and 3B, the regions of interest (ROIs) in the ground plane may be predefined. The mapping of the ROI from the ground plane to the image plane depends on known camera calibration values (i.e., camera orientation and lens characteristics). In this way, the pixels (and associated pixel values) for which image data in the captured image will be analyzed for feature extraction can be determined.

If desired, one or more regions of interest may be determined for a given image frame or frames. For example, a first region of interest 24-1 may be determined for a first portion of the image frame in which lane markers may be present (e.g., to the front and left of an automobile), and a second region of interest 24-2 may be determined for a second portion of the image frame in which lane markers may be present (e.g., to the front and right of an automobile). This, however, is merely illustrative. In general, any suitable number of regions of interest may be determined and used for one or more image frames.

At step 4044, portions of the image frame that lie within the regions of interest determined at step 4042 may be scanned to extract features, or portions of the image having characteristics that may be indicative of a lane marker. The scanning process may be performed on a row-by-row basis for pixel values that correspond to portions of the image frame in the region of interest. The scanning process may be similar to a Raster scan, and may require only one row of pixel values as an input. Features may be identified as a single pixel value corresponding to a single pixel in the image sensor, or may be identified as groups of pixel values corresponding to two or more pixels in an image sensor. These pixels may be adjacent pixels in the image sensor. Features may be identified (extracted) based on three components: the starting point of the feature in the image plane, the width of the feature in pixels, and the color of the feature. If desired, the color component may register as only one of four values: white, yellow, gray, or invalid (i.e., all other colors). The color component may be encoded using two bits.

Once a feature has been identified, it may be stored as a vector (sometimes referred to herein as a feature vector), rather than storing the actual image data and/or raw pixel values. In one suitable arrangement, the vector may include information (numerical representations) of the row(s) and column(s) (i.e., pixel coordinates) and color associated with the feature. Once the feature has been translated to a vector, all other image data (e.g., the raw image data associated with the feature and/or image data associated with un-extracted portions of the image that do not correspond the feature) may be excluded from further processing (i.e., disregarded, ignored, and/or not stored in the vector or other memory). In this way, a buffer is not needed to store the image data during lane marker detection operations, and a buffer-free algorithm may be used to process the extracted features with less processing power and computational burden than lane detection algorithms that require full-frame buffers.

In general, simple logic may be used for determining that a portion of an image does not correspond to a feature (sometimes referred to herein as clutter rejection). For example, portions of the image that are too wide, too long, not the correct color, etc. may be identified as not corresponding to a lane marker and disregarded.

At step 4046, features extracted from multiple different frames may be compared to determine continuity between features captured at different times (i.e., temporal continuity between features extracted from different images). If desired, features from two, three, four, five, ten, or more than ten, or any other suitable number of (consecutively captured) image frames may be analyzed to determine if features extracted from the multiple different image frames make up a continuous feature that is present across (i.e., extends across) the multiple different image frames. In this way, a short history of lane markers may be generated without requiring large amounts of memory and processing power. Continuous features in multiple different image frames may undergo "temporal fusion," which combines the features into a temporally-fused feature. By combining temporally continuous features into a combined temporal feature, lane markers may be more detectable at the initial determination stage.

Figure 5B:
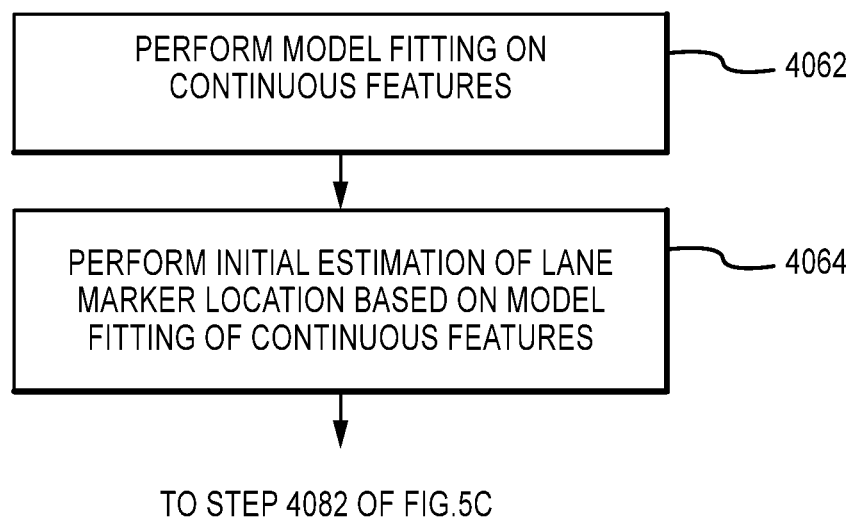
FIG. 5B is a flow chart of illustrative steps that may be performed in making a first determination of lane marker presence in accordance with an embodiment of the present invention.

A flow chart of illustrative steps that may be performed during initial lane marker location estimation operations (during step 406 of FIG. 4, for example) is shown in FIG. 5B.

At step 4062, model fitting may be performed on the continuous temporal features (from step 4046 of FIG. 5A, for example). During model fitting, the continuous temporal features may be projected to the ground plane using inverse perspective mapping, inverse perspective mapping may map the continuous features from the image plane to the ground plane. Performing inverse perspective mapping may remove perspective distortion associated with the continuous features when viewed in the image plane and simplify model fitting of the continuous features.

Model fitting may be used on the continuous features to provide an initial determination of whether or not the continuous features actually form lines and/or curves (i.e., represent lane markers). Model fitting may be based on the concept of Hough transform or its variants, but efficient implementation may be achieved without the use of an accumulator array to store voting scores in parameter space and without computing trigonometric functions, as required by standard Hough transform.

At step 4064, a classifier (which may be a first classifier; sometimes referred to herein as a decision tree or a group of decision trees) may be used to make an initial decision on whether or not the extracted features correspond to a lane marker. For example, lane marker detection logic may use the results of the model fitting performed at step 4062 to make an initial determination that a temporally continuous feature does correspond to a lane marker (e.g., the model fitting may indicate that the continuous feature corresponds to a line having qualities characteristic of a lane marker). Alternatively, lane marker detection logic may use the results of the model fitting at step 4062 to make an initial determination that a temporally continuous feature does not correspond to a lane marker (e.g., the model fitting may indicate that the continuous feature does not correspond to a shape having qualities characteristic of a lane marker). This initial determination of lane marker presence may be stored in memory in imaging system 10 while further feature processing is performed.

Figure 5C:
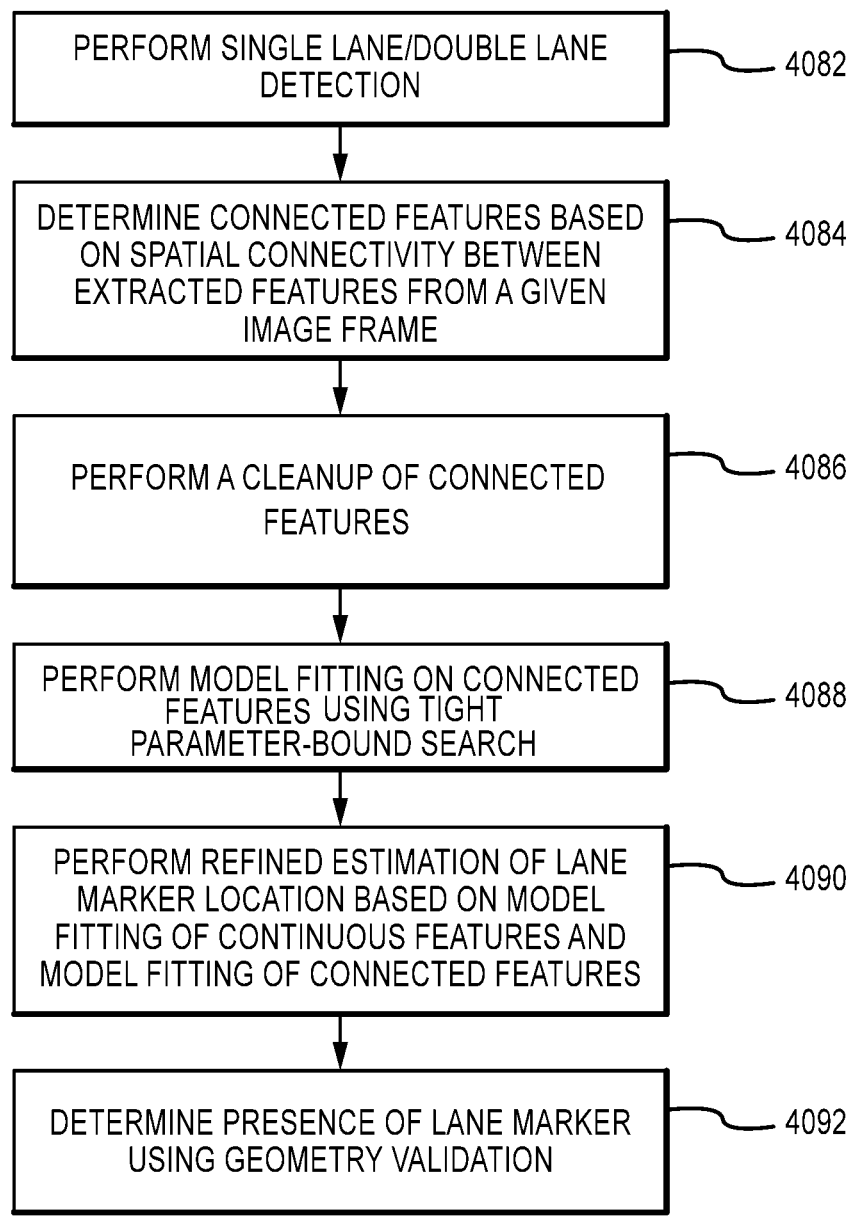
FIG. 5C is a flow chart of illustrative steps that may be performed in making a second determination of lane marker presence in accordance with an embodiment of the present invention.

A flow chart of illustrative steps that may be performed during refined lane marker location estimation operations (during step 408 of FIG. 4, for example) is shown in FIG. 5C.

At step 4082, detection of single and/or double lane markers of a given frame may be performed. For example, features extracted at step 4044 of FIG. 5A may be analyzed to determine if the features correspond to a single lane marking (i.e., one segmented or continuous line) or a double lane marking (i.e., two segmented and/or continuous, substantially parallel lines). In one suitable example, the features may be analyzed as vector features (as described above in connection with step 4044 of FIG. 5A) to determine whether the features correspond to a single lane marker configuration or a double lane marker configuration. This, however, is merely illustrative. In general, features may be analyzed in any suitable manner to determine whether the extracted features correspond to single or double lane markers.

At step 4084, multiple features extracted from an image frame (e.g., a single image frame out of a plurality of captured image frames) may be analyzed using a connectivity check algorithm to determine spatial connectivity between the features. If desired, the connectivity check algorithm may be performed in real-time on the most-recently captured image frame (i.e., as the image frames are captured). The connectivity check algorithm determines line segment connectivity between the features in the frame (i.e., analyzes the features to determine whether the multiple features in a given frame form a "line segment"-like object). Determining the spatial connectivity of the features may include taking into consideration perspective distortion of portions of the image frame that are present in the image plane. In this way, the connectivity check algorithm's determination of line segment connectivity may provide a more accurate determination of lane marker presence compared to merely considering pixel connectivity (in which perspective distortion may result in erroneous lane marker determinations). In one suitable arrangement, the connectivity determination algorithm may compare the feature components (e.g., size, color, etc.) to predetermined feature components that are characteristic of a lane marker, and determine whether the connected component corresponds to a lane marker. In another suitable example, the connectivity determination algorithm may determine that features are connected by analyzing the locations in an image frame to which the features correspond, and determining that the features represent directly adjacent or continuously connected portions of the image frame.

At step 4086, cleanup operations may be performed on the features or clusters of features that demonstrate connectivity as determined in step 4084. Numerous morphological operations may be performed on the features demonstrating connectivity during the cleanup operations. For example, connected components may undergo branch pruning operations and/or gap linking operations. After cleanup operations, only those feature points that belong to large, connected components in the image frame are selected. These features may be referred to as connected features. A connected feature may include multiple feature points within given image frame that are combined to form the connected feature.

At step 4088, model fitting may be performed on the connected features (from step 4086 of FIG. 5C, for example). In general, the model fitting of the connected features may be similar to the model fitting performed in connection with the temporally continuous features as described above in connection with step 4062 of FIG. 5B. If desired, however, the model fitting of step 4088 may be performed using a different algorithm(s) than that used in model fitting the temporally connected features to take into account the spatial connectivity of the connected features. In one suitable arrangement, model fitting of the connected features is performed within tight parameter bounds (in comparison to model fitting of the continuous features, for example) to improve efficiency and reduce complexity.

At step 4090, a classifier (which may be a second classifier) may be used to make a refined decision on whether or not the extracted features correspond to a lane marker. For example, lane marker detection logic may use the results of the model fitting performed at step 4088 to make a refined determination that a connected feature does correspond to a lane marker (e.g., the model fitting may indicate that the connected feature corresponds to a line having qualities characteristic of a lane marker). Alternatively, lane marker detection logic may use the results of the model fitting at step 4088 to make a refined determination that a connected feature does not correspond to a lane marker (e.g., the model fitting may indicate that the connected feature does not correspond to a shape having qualities characteristic of a lane marker). This refined determination of lane marker presence may be stored in memory in imaging system 10 while further feature processing is performed.

At step 4092, a classifier (which may be a third classifier) may be used to make a final lane marker presence determination. For example, lane marker detection logic may use the initial determination (described above in connection with step 4064) and the refined determination (described above in connection with step 4090) to determine whether or not a lane marker is present in one, both, or neither of the left region of interest 24-1 and the right region of interest 24-2. If desired, this lane marker detection step may include geometry validation to validate the shape and relative location of the detected lane markers against a predetermined lane marker shape. Upon determining that a lane marker is present, imaging system 10 may transmit the determination along with the information of the lane marker's location on the ground plane to a dedicated ADAS processor 22 for further processing, or may transmit the determination directly to drive control circuitry. In this way, the overall processing burden on a dedicated driver assist processor may be reduced.

Although the initial and refined lane marker detection determinations are described above as being consecutive operations, this is merely illustrative. If desired, these operations may be performed simultaneously on the same or different image frames.

In accordance with an embodiment of the present invention, a method of performing lane detection using a buffer-free imaging system in a vehicle may include capturing images with an image sensor in the imaging system, extracting feature points from streaming data using processing circuitry in the imaging system, storing image metadata for the extracted feature points in memory in the imaging system (without storing non-extracted portions of the images), and determining the presence of a lane marker based on the extracted feature points. The images may include regions of interest, and the processing circuitry may extract feature points from the regions of interest without extracting feature points from portions of the image frame outside the regions of interest. The regions of interest may be defined by predetermined shapes on ground plane and that are projected onto image plane. The processing circuitry may determine that a first subset of extracted feature points corresponds to a continuous feature that is present in a plurality of different image frames captured at different times. The processing circuitry may determine that a second subset of extracted feature points are directly adjacent to one another (e.g., correspond to directly adjacent portions of the images) such that the extracted feature points form a spatially connected feature. The processing circuitry may determine the presence of a lane marker based on the temporally continuous feature and the spatially connected feature.

In accordance with an embodiment of the present invention, a vehicular imaging system for performing lane detection operations without the use of a frame buffer may include an image sensor that captures image frames having regions of interest, feature extraction circuitry that extracts features from incoming streaming data within the regions of interest, memory that stores the extracted features without storing non-extracted portions of the image frames, and processing circuitry that determines the location of lane markers in the region of interest based on the extracted features stored in the memory. Each of the features may include metadata that includes information relating to the color, size, and location of the feature within the image frame. The metadata may be stored as a vector in the memory. The feature extraction circuitry may only extract features from portions of the image frames within the regions of interest. The processing circuitry may determine that a first plurality of features from multiple different captured image frames form temporally continuous features that span the multiple different captured image frames. The processing circuitry may determine that a second plurality of features from a single given captured image frame (which may be the most recently captured image frame) form spatially continuous regions in the image frame. The spatially continuous region may be formed entirely and exclusively of the extracted features. The extracted features that make up the spatially continuous region may be combined into a single connected feature. The presence of a lane marker may be determined based on the continuous feature and the connected feature. The vehicular imaging system may be included in a vehicle that also includes drive control circuitry and one or more driver assist system processors. The processing circuitry may transmit the location of the lane marker to the drive control circuitry and/or a driver assist system processor. The drive control circuitry and/or the driver assist system processor may control drive operations of the vehicle based on the received lane marker location.

A method of processing a plurality of image frames captured by a vehicular imaging system without storing the plurality of image frames in a buffer may include identifying points of interest in the image frames that indicate possible lane marker locations. Those points of interest may be extracted during the image capture process. The identified points may be stored in memory in the imaging system, while all other portions of the image may not be stored in memory in the imaging system. The processing circuitry that identifies the points of interest may determine that the points of interest form a continuous feature that is present throughout multiple frames and may determine that multiple feature points in a given one of the image frames connect to form a continuously connected "line segment"-like object. A lane marker may be detected based on the continuous feature and the continuously connected feature point line segment. Each of the image frames may include pixel values generated by individual image pixels arranged in rows and columns in the imaging system such that identifying the feature points may include analyzing the pixel values on a row-by-row basis. During the row-by-row analysis, the interest points may be identified based on the location (e.g., pixel coordinates) in the image frame that correspond to the points and the color of the point as indicated by the pixel values. The processing circuitry may map the continuous feature and the feature point line segment to the ground plane and perform model fitting on the features while mapped to the ground plane.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of performing lane detection using an imaging system in a vehicle, the method comprising:
    with an image sensor in the imaging system, capturing a plurality of images that each include rows of image data;
    with processing circuitry in the imaging system, extracting feature points from the rows of image data as the rows of image data are generated, wherein each feature point is extracted from a respective individual row of image data in an image as the image is captured;
    with memory in the imaging system, processing the extracted feature points to generate image metadata for the extracted feature points;
    storing the image metadata for the extracted feature points without storing non-extracted portions of the plurality of images;
    with the processing circuitry, determining that first extracted feature points from a first image in the plurality of images and second extracted feature points from a second image in the plurality of images form a single temporally continuous feature by comparing the first extracted feature points to the second extracted feature points; and
    with the processing circuitry, after storing the image metadata for the extracted feature points, determining the presence of a lane marker using the continuous feature and using the image metadata for the extracted feature points.

2. The method defined in claim 1, wherein each of the plurality of images includes a region of interest, and wherein extracting the feature points comprises extracting the feature points from portions of the image within the region of interest without extracting feature points from portions of the image outside of the region of interest.

3. The method defined in claim 2, wherein the plurality of images are captured in the image plane, the method further comprising:
    with the processing circuitry, mapping at least some of the feature points extracted from the rows of image data in the image plane to a corresponding location in the ground plane.

4. The method defined in claim 1, wherein the image metadata comprises information on the locations of the extracted feature points in the plurality of images and color information for the extracted feature points, and wherein storing the image metadata comprises storing the image metadata as a vector in the memory.

5. The method defined in claim 1, further comprising:
    with the processing circuitry, determining that a third group of extracted feature points from a given one of the plurality of images connect to form a line segment; and
    with the processing circuitry, combining the third group of extracted feature points into a connected feature.

6. The method defined in claim 5, wherein the presence of a lane marker is determined based on the connected feature.

7. A vehicular imaging system for performing lane detection without the use of a frame buffer, the vehicular imaging system comprising:
    an image sensor that captures image frames, wherein the image sensor includes an array of pixels arranged in rows and columns that generate raw pixel values;
    feature extraction circuitry that extracts features from the raw pixel values of a first portion of an image frame while the image sensor captures a second portion of the image frame wherein feature extraction from the image frame is complete when capture of the image frame is complete;
    memory that stores the extracted features without storing any of the raw image pixel values, wherein each of the extracted features comprise image metadata and wherein the metadata indicates a starting position of the extracted feature points in the rows of image data, a width of the extracted feature points, and color information for the extracted feature points; and
    processing circuitry that determines that a first set of features extracted from a first image frame in the image frames and a second set of features extracted from a second image frame in the image frames form a single temporally continuous feature by comparing the first set of features to the second set of features, wherein the processing circuitry determines the location of a lane based on the temporally continuous feature and the image metadata associated with the extracted features stored in the memory.

8. The vehicular imaging system defined in claim 7, wherein each of the image metadata includes a size of the feature, wherein the image metadata is stored as a vector in the memory, and wherein the color information is encoded using only two bits.

9. The vehicular imaging system defined in claim 7, wherein the feature extraction circuitry only extracts features in a predetermined region of interest in the captured image frames.

10. The vehicular imaging system defined in claim 7, wherein the processing circuitry detects that a given plurality of the extracted features from a given one of the image frames form a spatially connected region in the image frame, and wherein the processing circuitry combines the given plurality of extracted features to form a connected feature.

11. The vehicular imaging system defined in claim 10, wherein the processing circuitry determines the location of the lane marker based on the temporally continuous feature and the connected feature.

12. The vehicular imaging system defined in claim 7, wherein the processing circuitry transmits the location of the lane marker to drive control circuitry, and wherein the drive control circuitry modifies the operation of a vehicle that contains the vehicular imaging system and the drive control circuitry based on the location of the lane marker.

13. A method of processing a plurality of image frames captured by a vehicular imaging system without storing the plurality of image frames in a buffer, the method comprising:
    with processing circuitry in the vehicular imaging system, identifying points of interest that are indicative of the presence of lane markers in a respective image frame while the respective image frame is captured, wherein each of the points of interest is identified in the respective image frame before the entire respective image frame has been captured;

storing metadata associated with the points of interest in the plurality of image frames without storing the plurality of image frames;

with the processing circuitry, determining that the points of interest in the plurality of image frames form a continuous feature that is present in each of the image frames, based on the metadata associated with the points of interest in the plurality of image frames by comparing the points of interest in the plurality of image frames to each other;

with the processing circuitry, determining that a plurality of the points of interest in a given one of the image frames are spatially connected to form a connected feature; and with the processing circuitry, detecting a lane marker in the image frame based on the continuous feature and the connected feature.

14. The method defined in claim 13, wherein each image frame comprises pixel values, and wherein identifying the points of interest comprises:

with the processing circuitry, performing row-by-row line scanning of the pixel values in a given image frame while the image frame is being captured wherein identification of the points of interest is complete when image capture is complete.

15. The method defined in claim 14, wherein the points of interest are identified based on locations in the image frame to which the pixel values correspond and colors associated with the pixel values.

16. The method defined in claim 13, further comprising:

with the processing circuitry, mapping the continuous feature to the ground plane and performing first model fitting on the continuous feature while the continuous feature is mapped to the ground plane.

17. The method defined in claim 16, further comprising:

with the processing circuitry, mapping the connected feature to the ground plane and performing second model fitting on the connected feature while the connected feature is mapped to the ground plane.

18. The method defined in claim 13, further comprising:

storing the identified points of interest in memory in the vehicular imaging system without storing portions of the plurality of image frames that are not indicative of the presence of lane markers.

19. The method defined in claim 17, wherein the first model fitting uses first parameter bounds, wherein the second model fitting uses second parameter bounds, and wherein the second parameter bounds are tighter than the first parameter bounds.

* * * * *